United States Patent
Kajikawa et al.

(10) Patent No.: US 8,125,861 B2
(45) Date of Patent: Feb. 28, 2012

(54) OPTICAL DISK DEVICE

(75) Inventors: Kazuki Kajikawa, Osaka (JP); Toshiaki Fukui, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 262 days.

(21) Appl. No.: 12/560,782

(22) Filed: Sep. 16, 2009

(65) Prior Publication Data

US 2010/0074065 A1 Mar. 25, 2010

(30) Foreign Application Priority Data

Sep. 19, 2008 (JP) .................................. 2008-240453

(51) Int. Cl.
*G11B 7/00* (2006.01)

(52) U.S. Cl. ................. 369/44.27; 369/44.28; 369/44.29

(58) Field of Classification Search ............... 369/44.27, 369/44.28, 44.29

See application file for complete search history.

(56) References Cited

U.S. PATENT DOCUMENTS

| | | | |
|---|---|---|---|
| 6,246,646 B1 * | 6/2001 | Abe et al. ................... | 369/44.27 |
| 7,009,917 B2 * | 3/2006 | Chiang et al. ............... | 369/44.27 |
| 2003/0123345 A1 * | 7/2003 | Han et al. ................... | 369/44.29 |
| 2008/0137493 A1 * | 6/2008 | Shinichi ..................... | 369/44.23 |

FOREIGN PATENT DOCUMENTS

JP 2000-242933 A 9/2000

* cited by examiner

*Primary Examiner* — LaTanya Bibbins

(74) *Attorney, Agent, or Firm* — Pillsbury Winthrop Shaw Pittman, LLP

(57) ABSTRACT

This optical disk device includes a pickup, an offset means, a focus servo means, and a layer jump means. The offset means generates a focus error signal on the basis of the output of the pickup, and applies an offset voltage to that focus error signal. And the layer jump means performs layer jump operation, including kick start operation, kick end operation taking a second threshold value as a reference, brake start operation taking a third threshold value as a reference, and brake end operation. Moreover, before executing this layer jump operation, the layer jump means changes this second threshold value or this third threshold value, according to the value of the offset voltage.

4 Claims, 7 Drawing Sheets

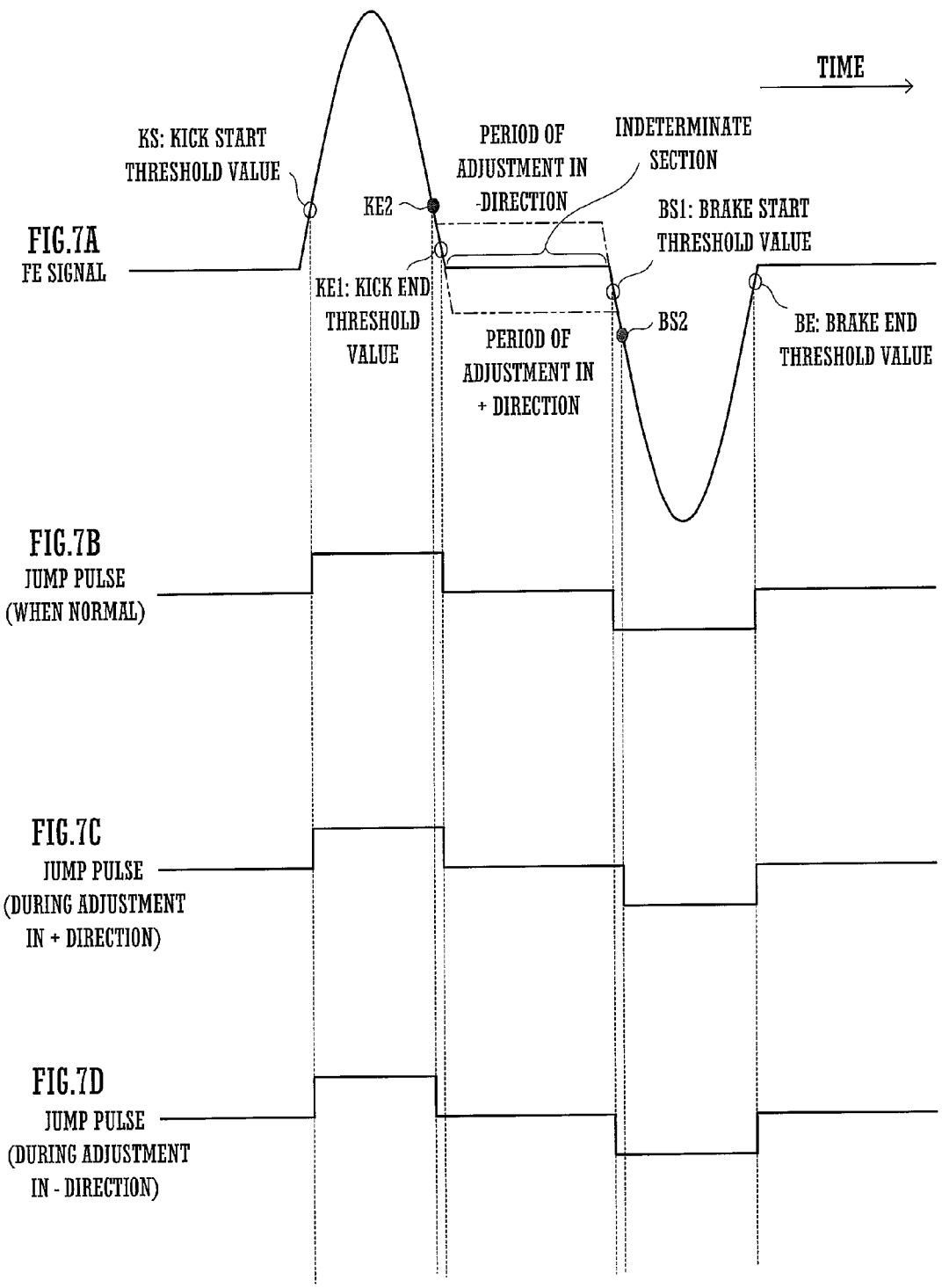

OPTICAL DISK DEVICE

CROSS REFERENCE

This Nonprovisional application claims priority under 35 U.S.C. §119(a) on Patent Application No. 2008-240453 filed in Japan on Sep. 19, 2008, the entire contents of which are hereby incorporated by reference.

BACKGROUND OF THE INVENTION

The present invention relates to an optical disk device which performs recording, replay, or deletion upon an optical disk which has a plurality of information recording layers, and in particular relates to such an optical disk device which performs layer jump.

From the past, optical disk devices which perform recording, replay, or deletion of information upon such optical disks have been generally widespread. These optical disks may be, for example, single sided two-layer type Blu-ray disks.

It is necessary for such a prior art type optical disk device to read out information recorded upon each layer of an optical disk (i.e. on both the first layer and the second layer) from that optical disk. Due to this, such a prior art type optical disk device transits from a state in which its pickup is reading out information recorded on the first layer to a state in which the pickup reads out information recorded on the second layer. In order to do this, such a prior art optical disk device performs so called "layer jump" operation. This "layer jump" is an operation in which the prior art type optical disk device applies a jump pulse, consisting of a kick pulse and a brake pulse, to an actuator, so as to drive an objective lens in the direction to approach the objective lens to an information recording surface of the optical disk, or in the opposite direction to withdraw the objective lens from the information recording surface. Corresponding to the change of the relative distance between the objective lens and the information recording surface of the optical disk which accompanies this shifting of the objective lens by the actuator, the output value of the FE signal follows a graph like that shown in FIG. 1A, which consists of two curves.

FIGS. 1A through 1D are figures showing the waveforms of the focus error signal (hereinafter termed the "FE signal") and the jump pulse during layer jump, for an optical disk device according to the prior art. With the layer jump described above, generally, the timings at which the kick pulse and the brake pulse are applied are controlled on the basis of the level of the FE signal shown in FIG. 1A.

To explain this matter in detail with reference to FIGS. 1A and 1B, when from the state in which focus servo control is being performed upon the first layer, the level of the FE signal becomes greater than a kick start threshold value KS, then this prior art optical disk device starts the application of a kick pulse to the actuator. Due to this, the objective lens is driven so as to accelerate in the direction to approach the objective lens towards the information recording surface of the optical disk, or in the opposite direction to withdraw the objective lens from the information recording surface. And, when the level of the FE signal becomes lower than a kick end threshold value KE, then this prior art optical disk device terminates the application of the kick pulse to the actuator. Due to this, the acceleration of the motion of the objective lens is terminated so that it transitions to motion at uniform speed, and it passes along an indeterminate section over which the FE signal is not outputted.

And, when the level of the FE signal becomes less than a brake start threshold value BS, then this prior art optical disk device starts the application of a brake pulse to the actuator. Due to this, braking is applied to the motion of the objective lens in the opposite direction to that of its motion at uniform speed. And, when the level of the FE signal becomes greater than a brake end threshold value BE, then this prior art optical disk device terminates the application of the brake pulse to the actuator. Due to this, the acceleration of the motion of the objective lens is terminated. Subsequently, this prior art optical disk device performs focus servo control upon the second layer of the disk.

A layer jump is executed with the above type of flow. In this manner, such a prior art type optical disk device transits from a state in which its pickup is reading out information recorded on a first layer of a disk, to a state in which the pickup reads out information recorded upon the second layer of the disk.

It should be understood that, in Japanese Laid-Open Patent Publication 2000-242933, there is proposed a pickup device which applies an offset voltage to the FE signal when the reading layer of the optical disk is changed.

However, sometimes it happens that a so-called inter-layer offset occurs over the indeterminate section shown in FIG. 1A. This inter-layer offset depends upon the adjusted value of an offset voltage which is applied in order to cancel offset of the FE signal. For example, if the FE signal is offset adjusted in the + direction, then an inter-layer offset of the form shown by the double-dotted broken line in FIG. 1A is generated in the intermediate section described above. In a similar manner, if the FE signal is offset adjusted in the − direction, then an inter-layer offset of the form shown by the single-dotted broken line in FIG. 1A is generated in the intermediate section described above.

When an inter-layer offset such as shown in FIG. 1A is generated in the intermediate section described above, then, when the offset is being adjusted in the + direction, the timing at which the application of the brake pulse is started becomes unduly early, which is undesirable. (Refer to FIG. 1C.) In a similar manner, when the offset is being adjusted in the − direction, the timing at which the application of the kick pulse is terminated becomes unduly early, which is likewise undesirable. (Refer to FIG. 1D.) When the timing at which the application of the brake pulse starts or the timing at which the application of the kick pulse terminates changes greatly in this way, the brake or the kick is applied too severely. Because of this, a prior art type optical disk device of the type described above may become unable to transition to a state in which focus servo control is performed upon the second layer. In the worst case, there is also a fear that the objective lens may come into collision with the recording surface of the optical disk, which is extremely undesirable.

Accordingly, with such a prior art type optical disk device, if an inter-layer offset such as described above occurs, there is the problem that it cannot smoothly transition from a state in which its pickup is reading out information recorded upon the first layer of the disk, to a state in which the pickup reads out information recorded upon the second layer of the disk. Since, in the worst case, with such a prior art type optical disk device, there is also a fear that the objective lens may undesirably come into collision with the recording surface of the optical disk, accordingly there is also the problem that damage to the objective lens, and/or damage to the optical disk, may take place.

The object of the present invention is to provide an optical disk device which is capable of transitioning smoothly between a state in which it is reading out information recorded on the first layer and a state in which it reads out information recorded on the second layer, even if an offset is present between the layers.

SUMMARY OF THE INVENTION

The optical disk device according to the present invention includes a pickup, an offset means, a focus servo means, and a layer jump means.

The pickup irradiates laser light upon an optical disk having a plurality of information recording layers, and detects light reflected therefrom. The offset means generates a focus error signal on the basis of the reflected light detected by the pickup. Moreover, the offset means applies to the focus error signal an offset voltage specifying an adjusted voltage value, and outputs the result as an offset focus error signal. And the focus servo means performs focus servo control on the basis of this offset focus error signal outputted from the offset means. This focus servo control is control to shift the lens in a direction to approach the lens towards and withdraw the lens from an information recording surface of a predetermined layer of the information recording layers, thus focusing the laser light upon that information recording surface.

And the layer jump means performs layer jump operation. This layer jump operation is an operation to shift the lens from a position in which focus servo control is being performed upon a first layer, to a position in which focus servo control is performed upon a second layer. And this layer jump operation includes four operations: a kick start operation, a kick end operation which references a second threshold value, a brake start operation which references a third threshold value, and a brake end operation.

Moreover, before executing this layer jump operation, the layer jump means changes the value of the second threshold value or the value of the third threshold value, according to the value of the offset voltage.

BRIEF DESCRIPTION OF THE DRAWINGS

FIGS. 7A through 7D are figures for this optical disk device according to an embodiment of the present invention, showing the waveforms of the FE signal and the jump pulse during layer jump.

DETAILED DESCRIPTION OF THE INVENTION

Embodiments of the optical disk device according to the present invention will now be described.

Figure 1:
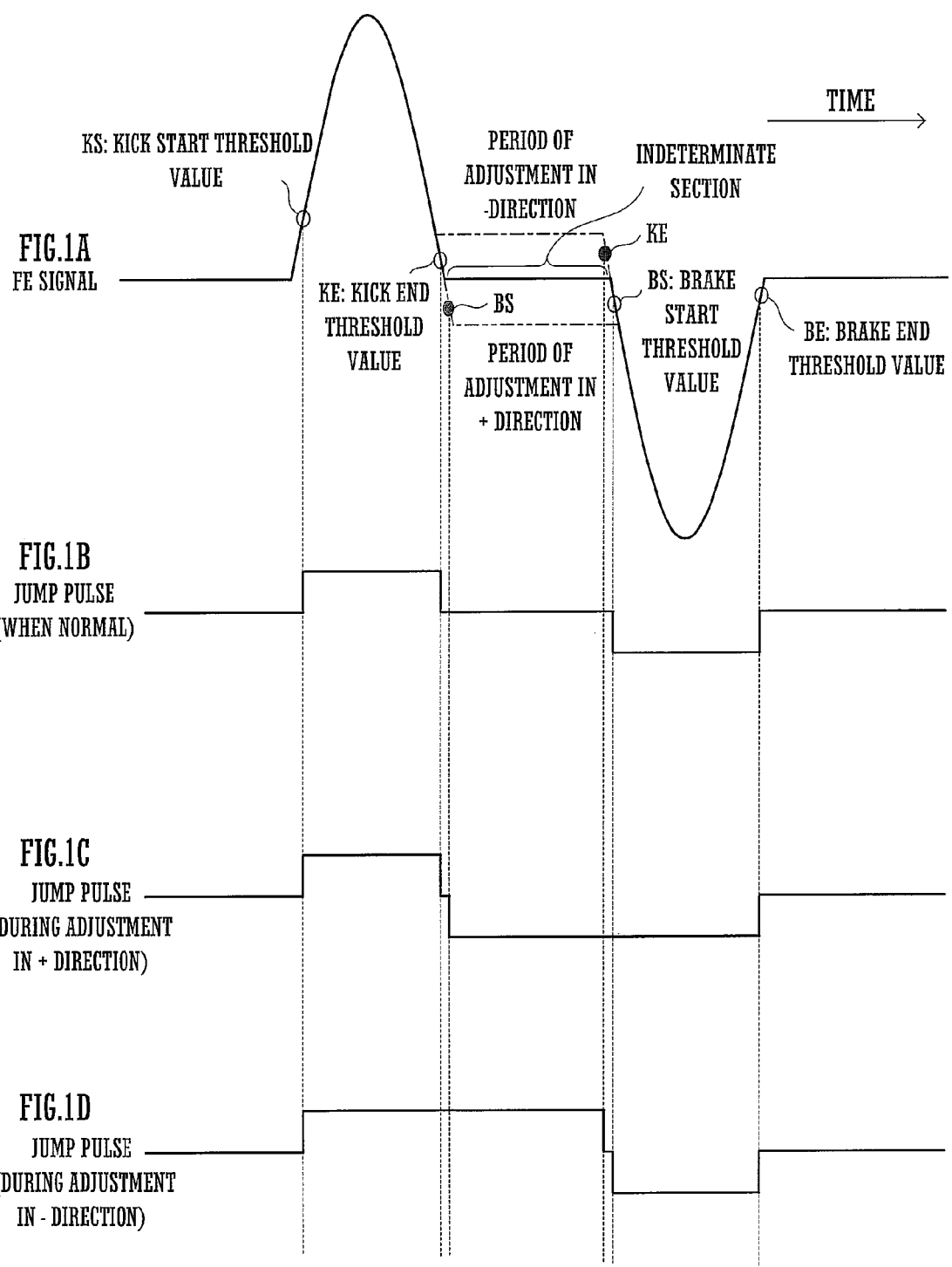
FIGS. 1A through 1D are figures showing the waveforms of the FE signal and the jump pulse during layer jump with a prior art type optical disk device.
Figure 2:
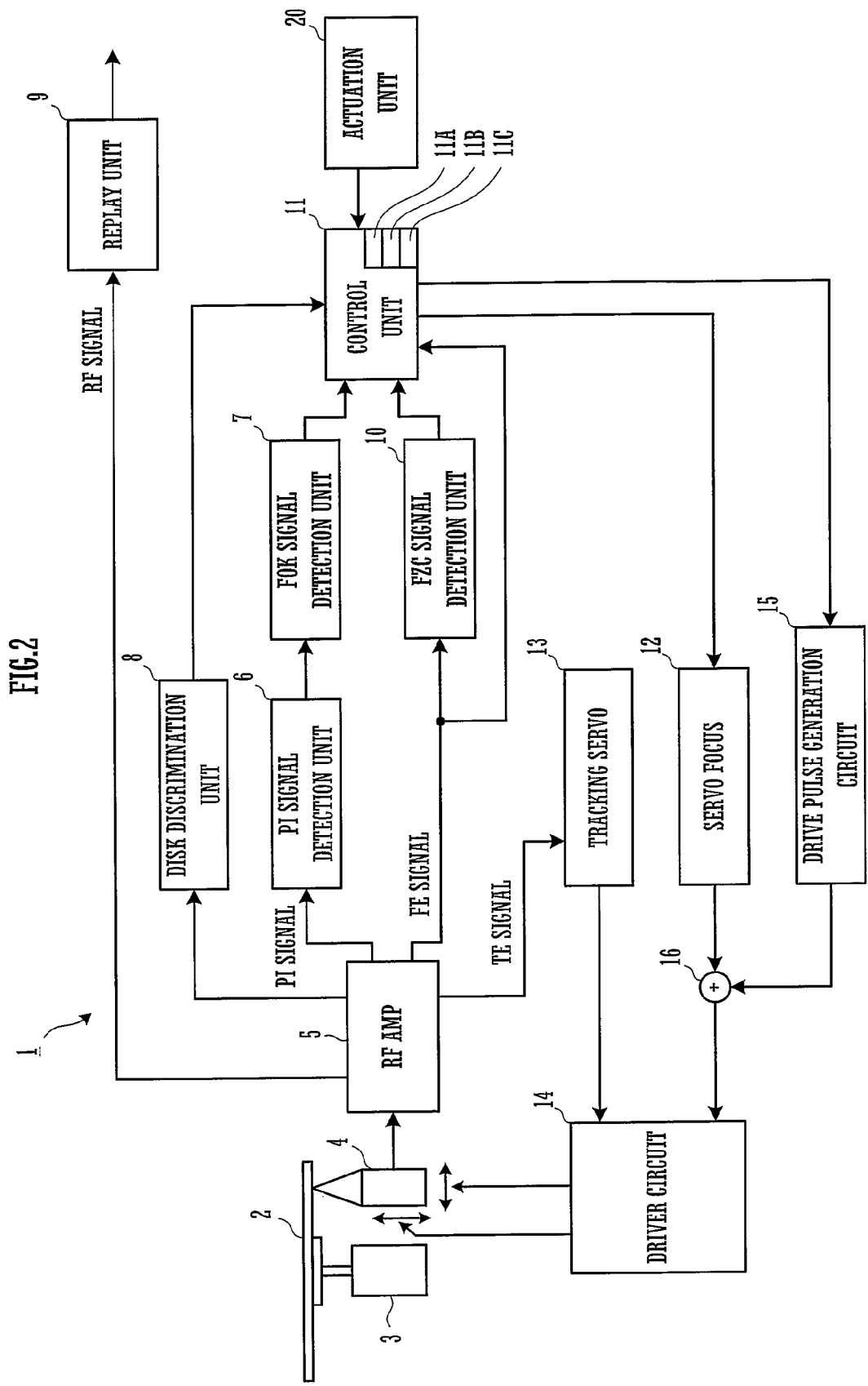
FIG. 2 is a block diagram showing the main structure of an optical disk device according to an embodiment of the present invention.

FIG. 2 is a block diagram showing the main structure of an optical disk device which is an embodiment of the present invention. This optical disk device 1 is a so-called Blu-ray player. And, as shown in FIG. 2, this optical disk device 1 comprises a spindle motor 3, a pickup 4, an RF amp 5, a PI signal (pull in signal) detection unit 6, a FOK signal (focus OK signal) detection unit 7, a disk discrimination unit 8, a replay unit 9, a FZC signal (focus zero cross detection signal) detection unit 10, a control unit 11, a focus servo circuit 12, a tracking servo circuit 13, a driver circuit 14, a drive pulse generation circuit 15, an adder 16, and an actuation unit 20.

An optical disk 2 is an optical disk which has a plurality of information recording layers. This optical disk 2 may, for example, be a DVD (Digital Versatile Disk) or a Blu-ray disk. The optical disk 2 is rotationally driven by the spindle motor 3.

The pickup 4 includes a laser diode (hereinafter referred to as the "LD"), a collimator lens, a beam splitter, an objective lens 4A, a photodetector, a thread motor, and an actuator, none of which are shown in the figure.

This pickup 4 is fitted to an axis which extends in the radial direction of the optical disk 2, so as to be able to shift freely therealong. The thread motor shifts the pickup 4 along the radial direction of the optical disk 2. The LD is a light source which outputs laser light. The objective lens 4A adjusts the position upon the optical disk 2 upon which the laser light is irradiated. And the actuator shifts the objective lens 4a in the direction to approach the objective lens 4A towards or to withdraw the objective lens 4A from the optical disk 2, and in the radial direction of the optical disk 2.

Figure 3:
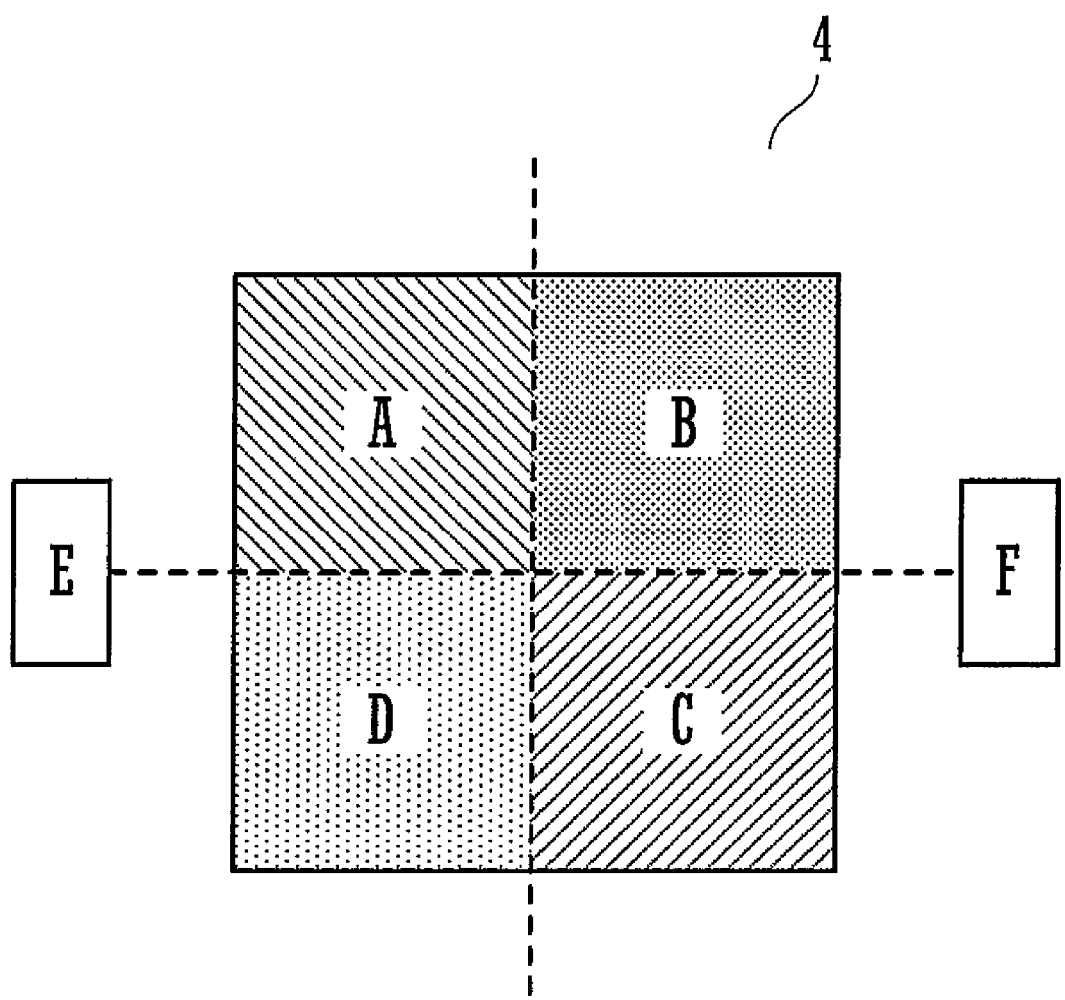
FIG. 3 is a figure showing an arrangement of photodiodes provided to a photodetector.

Furthermore, as for example shown in FIG. 3, the photodetector comprises four separate photodiodes A, B, C, and D, and photodiodes E and F which are arranged in front of and behind them, or to their left and right. This photodetector receives reflected light which is obtained by the LD irradiating its laser beam upon the signal surface of the optical disk 2 via the objective lens 4A. This photodetector outputs to the RF amp 5 the detection signals A, B, C, and D detected by the photodiodes A, B, C, and D, and the detection signals E and F detected by the photodiodes E and F.

The RF amp 5 performs calculation of (A+B+C+D), using the detection signals A, B, C, and D outputted from the pickup 4. And the RF amp 5 generates a RF signal, which is the result of this calculation. Moreover, the RF amp 5 performs application of an offset voltage to, and amplification of, the RF signal. Then, by performing waveform shaping using a waveform shaping circuit not shown in the figures, the RF amp 5 converts the RF signal to a two-valued RF signal. And the RF amp 5 outputs this converted two-valued RF signal to the replay unit 9.

Furthermore, the RF amp 5 performs calculation of (A+C)−(B+D), using the detection signals A, B, C, and D outputted from the pickup 4. And the RF amp 5 generates a focus error signal (hereinafter termed the "FE signal"), which is the result of this calculation. Moreover, the RF amp 5 outputs this FE signal to the FZC detection unit 10 and the control unit 11, after having performed application of a set offset voltage to the FE signal and amplification thereof.

In this offset voltage, there is a component to displace the FE signal to the plus side and a component to displace it to the minus side, and it cancels defocusing caused due to offset of the pickup 4 and its peripheral circuitry. The value of this offset voltage may, for example, be 10 mV. The value of this offset voltage is given by adjusting F_BAL (focus balance). Moreover, the value of this offset voltage corresponds to the adjustment value F_BAL. The adjustment value F_BAL which has been set is stored in a register 11C (not shown in the figures) of the control unit 11, and the control unit 11 sets the value of the offset voltage corresponding to this adjustment value F_BAL to the RF amp 5.

Furthermore, the RF amp 5 performs calculation of (E−F), using the detection signals E and F outputted from the pickup 4. The RF amp 5 then generates a tracking error signal (hereinafter termed the "TE signal"), which is the result of this calculation. And the RF amp 5 performs application of an offset voltage to this TE signal, and amplification thereof. Then the RF amp 5 outputs the TE signal to the tracking servo circuit 13.

Even further, on the basis of the detection signals A, B, C, and D outputted from the pickup 4, the RF amp 5 generates a pull in signal (hereinafter termed the "PI signal"), which is a signal related to the total amount of light received by the photodetectors of the pickup 4. Moreover, the RF amp 5 outputs this PI signal which it has generated to the PI signal detection unit 6. This PI signal is a signal containing the low frequency component of the RF signal. And this PI signal indicates the reflectivity of the optical disk.

The PI signal detection unit 6 detects the PI signal outputted from the RF amp 5. And, on the basis of this detected PI signal, this PI signal detection unit 6 generates a FOK signal, which is a signal comparing the total amount of light received by the photodetectors of the pickup 4 with a predetermined threshold value $Th_1$ (refer to FIG. 5B). And the PI signal detection unit 6 outputs this FOK signal which it has generated to the FOK signal detection unit 7. This FOK signal is a signal which indicates the range over which focusing can be performed.

When the FOK signal detection unit 7 detects the focus OK signal (i.e. the FOK signal) outputted from the PI signal detection unit 6, it outputs this FOK signal to the control unit 11.

The FZC signal detection unit 10 inputs the FE signal outputted from the RF amp 5. And, on the basis of this FE signal which is detected as a S-shaped waveform component, the FZC signal detection unit 10 generates a focus zero cross detection signal (hereinafter termed the "FZC signal"), which is a signal comparing this S-shaped waveform component of the FE signal with a predetermined threshold value. And the FZC signal detection unit 10 outputs this FZC signal which it has generated to the control unit 11.

The control unit 11 consist of, for example, a microcomputer. This control unit 11 includes a ROM 11A in which a control program is stored, a RAM 11B which serves as a working space for keeping data processed by this control program, and a register 11C which holds the state of operation execution and so on.

The control unit 11 controls the operation of the various sections of the optical disk device 1. Moreover, the control unit 11 transmits the inputted FE signal to the focus servo circuit 12, while monitoring the FOK signal and the FZC signal.

On the basis of the FE signal inputted from the RF amp via the control unit 11, the focus servo circuit 12 generates a focus servo signal for bringing the value of the FE signal to 0 (its reference level). And the focus servo circuit 12 outputs this focus servo signal to the driver circuit 14 via the adder 16.

Moreover, on the basis of the TE signal outputted by the RF amp 5, the tracking servo circuit 13 generates a tracking servo signal for bringing the value of the TE signal to 0 (its reference level). And the tracking servo circuit 13 outputs this tracking servo signal to the driver circuit 14.

The driver circuit 14 amplifies the focus servo signal and outputs to the actuator a drive voltage corresponding to the amplified focus servo signal. Due to this, the driver circuit 14 shifts the objective lens 4A along the direction of the optical axis with respect to the optical disk 2, and performs focus servo control to focus the laser light upon the information recording surface of the optical disk 2.

Moreover, the driver circuit 14 amplifies the tracking servo signal and outputs to the actuator a drive voltage corresponding to the amplified tracking servo signal. Due to this, the driver circuit 14 shifts the objective lens 4A of the pickup 4 in the radial direction of the optical disk 2, and performs tracking servo control to irradiate the laser light upon the center of the track upon the optical disk 2.

By thus performing focus servo control and tracking servo control, this optical disk device 1 tracks the laser light along the desired track, and moreover is able to adjust the focal point of the laser light upon this track. Furthermore, in this optical disk device 1, spindle servo control is also performed so as to rotate the optical disk 2 with the spindle motor 3 at a target rotational speed. However, the details of structure related to this spindle servo control are not shown in FIG. 2.

Next, the replay unit 9 generates audio and video data by performing demodulation processing upon the two-valued RF signal outputted from the RF amp 5. And the replay unit 9 decodes this audio and video data which it has generated (for example, by MPEG). Furthermore, the replay unit 9 performs D/A conversion upon this audio and video data. And the replay unit 9 outputs the result to a television or the like which is connected to this optical disk device 1. Thus, on this television, the user is able to view audio and video based upon the audio and video data.

The actuation unit 20 has a plurality of keys which receive actuation input from the user. This plurality of keys may, for example, include a replay key for receiving a command to replay an optical disk which is loaded, and a time search replay key for receiving a command to perform time search replay upon such an optical disk. Time search replay is a process in which a predetermined replay time point within the entire replay period for the data recorded upon the optical disk is inputted by time search replay key, and replay is performed starting at this replay time point, i.e. from partway along the data. This predetermined replay time point corresponds to a time period which would elapse during replay of the data recorded upon the optical disk from its start.

From the RF signal outputted from the RF amp 5, the disk discrimination unit 8 generates a mirror signal by reflection from the surface of the optical disk 2 (hereinafter termed the "surface reflection disk detection signal"), and a mirror signal by reflection from the signal surface of the optical disk 2 (hereinafter termed the "signal surface reflection disk detection signal"). And the disk discrimination unit 8 determines the type of the optical disk 2 on the basis of this surface reflection disk detection signal and this signal surface reflection disk detection signal which it has thus generated.

In concrete terms, the disk discrimination unit 8 measures the interval which is detected by the surface reflection disk detection signal and the signal surface reflection disk detection signal. And if this interval is, for example, an interval T1, then the disk discrimination unit 8 decides that this optical disk 2 is a CD. On the other hand, if this interval is an interval T2 which is greater than the interval T1, then the disk discrimination unit 8 decides that this optical disk 2 is a Blu-ray disk. This is based upon taking advantage of the difference in the thickness of the respective disk substrates: for a CD the thickness of the disk substrate is 1.2 mm, whereas for a Blu-ray disk the thickness of the disk substrate is 0.6 mm.

Moreover if, on the basis of the PI signal outputted from the PI signal detection unit, the disk discrimination unit 8 has decided that this optical disk 2 is a Blu-ray disk, then it makes a decision as to whether this optical disk 2 is a 1-layer disk or a 2-layer disk. In concrete terms, for example, the disk discrimination unit 8 may decide that this optical disk 2 is a 1-layer disk if the reflectivity of the optical disk 2 to light is 45%~85%. On the other hand, the disk discrimination unit 8 may decide that this optical disk 2 is a 2-layer disk if its reflectivity to light is 18%~30%.

The disk discrimination unit 8 notifies the control unit 11 of the result of this decision as to the type of the optical disk 2 (hereinafter this will be termed the "disk distinguishing result information").

And, on the basis of this disk distinguishing result information notified from the disk discrimination unit 8, the control unit 11 recognizes that this optical disk 2 is, for example, a CD or a Blu-ray disk. Moreover, if this optical disk 2 is a Blu-ray disk, the control unit 11 also recognizes whether this optical disk 2 is a 1-layer disk or a 2-layer disk.

Based upon a command from the control unit 11, the drive pulse generation circuit 15 generates a jump pulse from a kick pulse and a brake pulse. And the drive pulse generation circuit 15 outputs this jump pulse to the adder 16. Here, the kick pulse and the brake pulse are given corresponding polarities. In detail, a voltage which is applied to cause the objective lens 4A to be accelerated in a direction to approach towards an information recording layer of the optical disk 2 or in the opposite direction to withdraw from the information recording layer of the optical disk 2, is termed a focus kick. And the signal for this applied voltage is termed a kick pulse. Moreover, a voltage which is applied to drive the objective lens 4A in the opposite direction to the direction of the uniform speed motion imparted by a focus kick is termed a focus brake, and the signal for this applied voltage is termed a brake pulse.

The adder 16 adds the output signal from the focus servo circuit 12 and the jump pulse from the drive pulse generation circuit 15. And the adder 16 outputs the resulting sum electrical signal to the driver circuit 14.

It should be understood that the control unit 11, the focus servo circuit 12, the adder 16, and the driver circuit 14 correspond to the "focus servo means" of the Claims. Moreover, the control unit 11, the drive pulse generation circuit 15, the adder 16, and the driver circuit 14 correspond to the "layer jump means" of the Claims. And the RF amp 5 corresponds to the "offset means" of the Claims.

Figure 4:
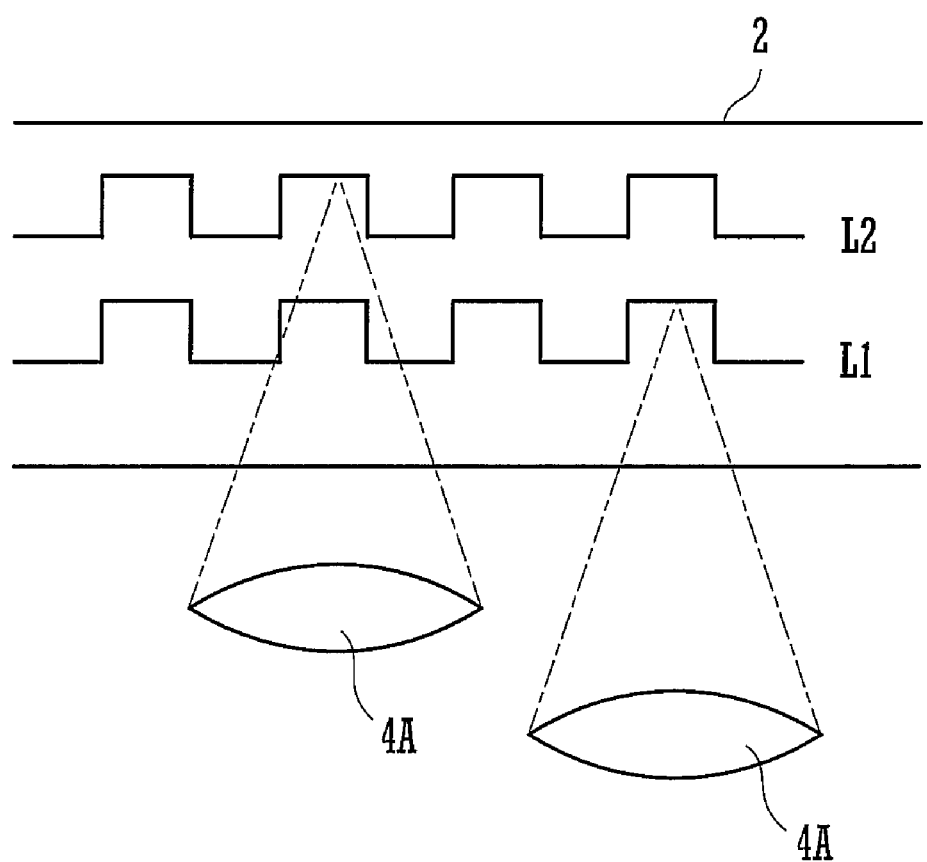
FIG. 4 is a figure showing a situation in which focus servo is being performed upon the data recording layers of an optical disk 2.
Figure 5:
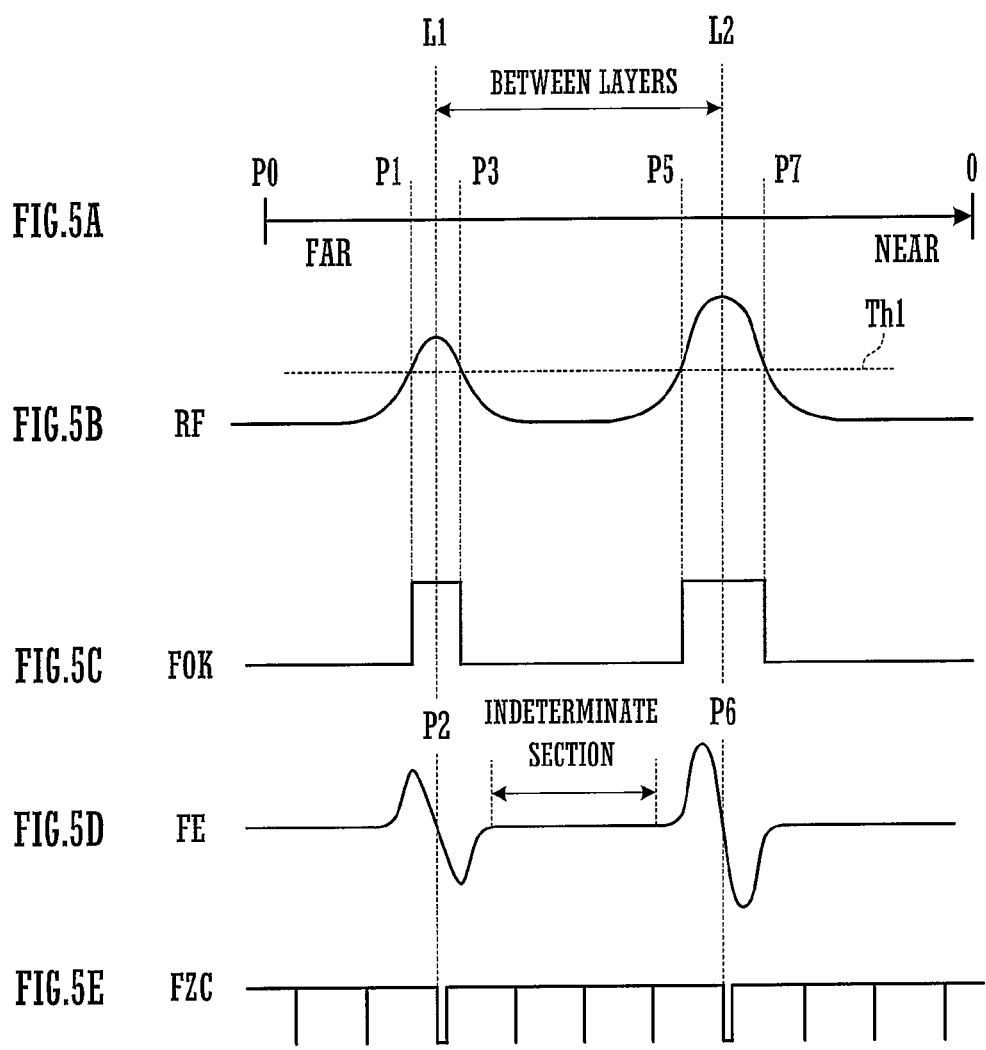
FIGS. 5A through 5E are figures showing the waveforms of signals corresponding to change of the relative distance between the information recording surface of the optical disk 2 and an objective lens.

FIG. 4 is a figure showing a state in which focus servo control upon the data recording layers of the optical disk 2 is being performed. And FIGS. 5A through 5E are figures showing the waveforms of signals described above, corresponding to change of the relative distance between the information recording surface of the optical disk 2 and the objective lens. FIG. 5A is a figure showing the relative distance between the information recording surface of the optical disk 2 and the objective lens. And FIGS. 5B through 5E are figures showing the waveforms of signals corresponding to change of this relative distance.

As previously described, the optical disk 2 is a single sided 2-layer type optical disk (refer to FIG. 4). From this optical disk 2, it is necessary to read out information recorded upon both the layers of this optical disk 2 (i.e. from its first layer L1 and its second layer L2) with the optical disk device 1. Due to this, the optical disk device 1 must transition from a state in which its pickup 4 is reading out information recorded upon the first layer L1, to a state in which its pickup 4 reads out information recorded upon the second layer L2. In order to do this, the optical disk device 1 performs the operation of so-called "layer jump". This "layer jump" is an operation in which the optical disk device 1 applies a jump pulse to the actuator, so as to drive the objective lens 4A in the direction to approach the objective lens to an information recording surface of the optical disk, or in the opposite direction to withdraw the objective lens from the information recording surface. The jump pulse consists of a kick pulse and a brake pulse. And by executing this layer jump, the optical disk device 1 shifts the objective lens 4A from a state in which it is performing focus servo control upon the first layer L1, to a state in which it performs focus servo control upon the second layer L2.

Along with the shifting of the objective lens 4A, the output value of the FE signal follows two S-shaped curves with respect to the accompanying change of the relative distance between the lens 4A and the information recording surface of the optical disk 2 (refer to FIG. 5D). Moreover, during the transition between the state in which focus servo control is being performed upon the first layer L1 to the state in which focus servo control is performed upon the second layer L2, there is an indeterminate section in which the FE signal is not outputted.

From the state in which focus servo control is being performed upon the first layer L1 past the indeterminate section, when an RF signal which exceeds a predetermined threshold value Th1 is obtained, the FOK signal is obtained in the sections $P_1 \sim P_3$ and $P_5 \sim P_7$. And, when the FE signal crosses focus zero at the base points $P_2$ and $P_6$ (refer to FIGS. 5D and 5E), the control unit 11 resumes focus servo control, taking these base points $P_2$ and $P_6$ as standard points. Due to this, the optical disk device transitions to its state in which it is performing focus servo control upon the second layer L2.

It should be understood that, when the objective lens 4A is positioned at the base point $P_0$ (refer to FIG. 5A), the objective lens 4A and the information recording surface of the optical disk 2 are at their furthest distance apart. On the other hand, when the objective lens 4A arrives at the base point 0, the objective lens 4A and the information recording surface of the optical disk 2 come into collision.

Figure 6:
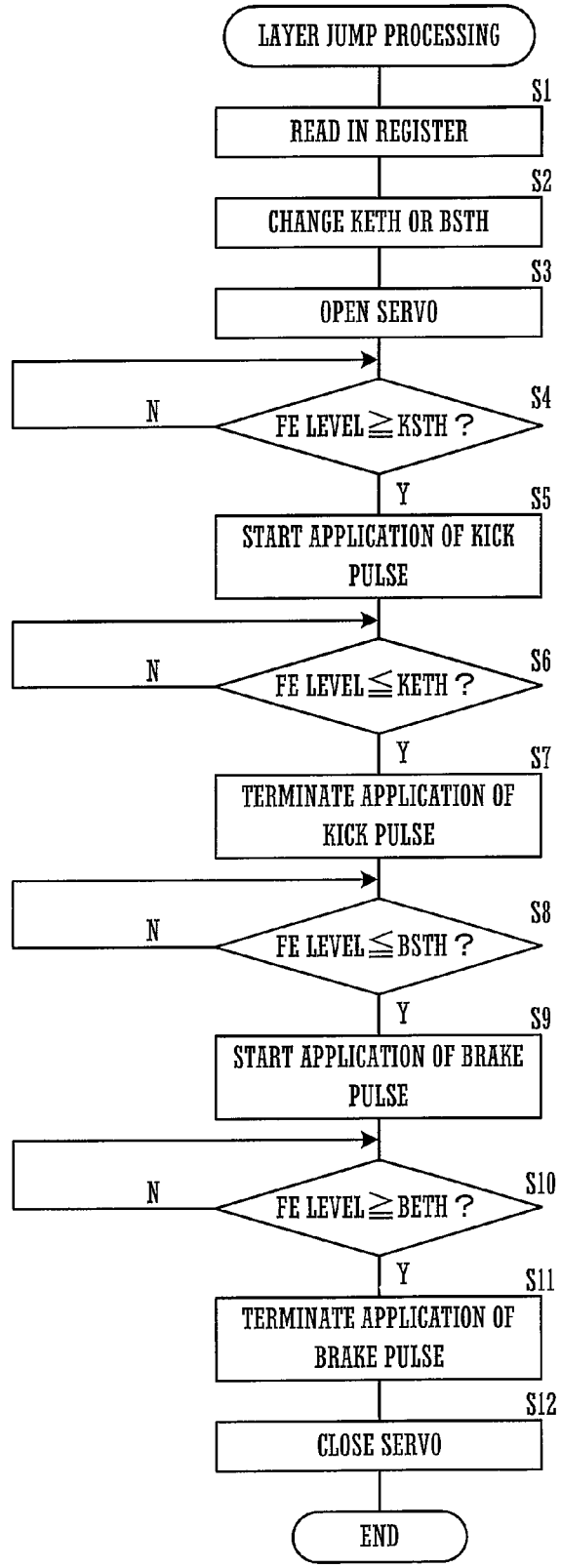
FIG. 6 is a flow chart showing operations performed by a control unit of this optical disk device according to an embodiment of the present invention during layer jump.

FIG. 6 is a flow chart showing operations performed by the control unit of this optical disk device according to an embodiment of the present invention during layer jump. And FIGS. 7A through 7D are figures for this optical disk device according to an embodiment of the present invention, showing the waveforms of the FE signal and the jump pulse during layer jump. The operation shown in FIG. 6 is performed when, for example, during replay of the first layer L1 of the optical disk 2, by using the time search key of the actuation unit 20, the user issues a command for replay of video and/or audio data recorded upon the second layer L2. Using the FIG. 6 flow chart, a scenario will be explained in which the focal position is shifted from the recording surface of the second layer L2 of the optical disk 2 to the recording surface of its first layer L1.

It should be understood that, by changing the sense of the comparison symbol "□" in the steps S4 and S10 to the opposite sense, i.e. to "□", and by changing the sense of the comparison symbol "□" in the steps S6 and S8 to the opposite sense, i.e. to "□", the description shown in FIG. 6 may also be applied to an opposite scenario, in which the focal position is shifted from the recording surface of the first layer L1 of the optical disk 2 to the recording surface of its second layer L2.

First, the control unit 11 reads the adjusted value of F_BAL from the register 11C (a step S1). And, according to this adjusted value of F_BAL, the control unit 11 changes the value of the kick end threshold value KE or the value of the brake start threshold value BS. In more detail, if the voltage offset is displaced by the F_BAL adjustment to the plus side of the focus error signal, then the value of the brake start threshold value BS is reduced. For example, the value of the brake start threshold value BS may be changed from BS1 to BS2. In a similar manner, if the voltage offset is displaced by the F_BAL adjustment to the minus side of the focus error signal, then the value of the kick start threshold value KE is increased. For example, the value of the kick start threshold value KE may be changed from KE1 to KE2.

Next, the control unit 11 opens the focus servo control (a step S3). Due to this, the state of performing focus servo control upon the recording surface at the second layer L2 of the optical disk 2 is cancelled. To describe this step S3 in more detail, the control unit 11 comprises a hold circuit which turns the focus servo loop OFF, and which also holds the level of the FE signal directly before this servo open operation was performed. As a result, the focus error signal level directly before the servo open operation (in other words, the level of charge accumulated in a capacitor included in the hold circuit) is outputted to the adder 16. Here, it will be supposed that the level of the FE signal which is held by the hold circuit is a higher level than the zero level.

If the level of the FE signal is greater than or equal to the kick start threshold value KS (a step S4), then the control unit 11 commands the drive pulse generation circuit 15 to generate a kick pulse (a step S5). Due to this, the drive pulse generation circuit 15 generates a kick pulse shown in FIG. 7C or FIG. 7D corresponding to this command, and outputs this kick pulse to the adder 16. And the adder 16 adds together the high level positive polarity exhibited by this jump pulse and the hold level outputted from the hold circuit. Then the adder outputs a drive signal according to this total level to the driver circuit 14. Due to this, over the interval over which the kick pulse is generated, the objective lens 4A is driven to be accelerated in the direction to shift towards the recording surface of the first layer L1, thus taking a position in which it focuses the read light thereupon as its new target. Together with this the level of the FE signal, which until now was almost zero level, gradually becomes greater in the positive direction along with the focusing position of the read light moving away from the recording surface which it was tracking, and, after having passed through its maximum positive value, describes a peak and returns back to the zero level again (refer to FIG. 7A).

And, when the level of the FE signal becomes less than or equal to the kick end threshold value KE1 (or KE2 during adjustment in the minus direction) (a step S6), then the control unit 11 issues a command to the drive pulse generation circuit 15 to terminate the kick pulse (a step S7). Due to this, the drive pulse generation circuit 15 stops generating the kick pulse shown in FIG. 7C or FIG. 7D, according to this command. After the generation of the kick pulse has been stopped, since there is some drive inertial momentum due to the kick pulse, the actuator continues its displacement so as to shift the focusing position of the read light towards the recording surface of the first layer L1, which is the target. In other words, the acceleration of the objective lens 4A is stopped, and it transitions to motion at uniform speed. During this motion at uniform speed, the waveform of the FE signal reaches its intermediate region, and, when the lens 4A shifts further, the influence of the first layer L1 starts to be exerted upon the FE signal. Here, sometimes it may happen that an inter-layer offset is created in this intermediate region. This inter-layer offset depends upon the adjustment value (F_BAL adjustment value) of the offset voltage which is applied for cancelling the offset of the FE signal which is generated. For example, if the FE signal is to be offset adjusted in the + direction, then an inter-layer offset having the shape shown by the double-dotted broken line in FIG. 7A is generated in the above described intermediate section. In a similar manner, if the FE signal is to be offset adjusted in the − direction, then an inter-layer offset having the shape shown by the single-dotted broken line in FIG. 7A is generated in the above described intermediate section.

When the level of the FE signal becomes less than or equal to the brake start threshold value BS1 (or BSD during adjustment in the plus direction) (a step S8), then the control unit 11 commands the drive pulse generation circuit 15 to generate a brake pulse (a step S9). Due to this, the drive pulse generation circuit 15 generates a brake pulse of negative polarity shown in FIG. 7C or FIG. 7D corresponding to this command, and outputs this brake pulse to the adder 16. And the adder 16 adds together the low level exhibited by this brake pulse and the hold level outputted from the hold circuit. Then the adder outputs an output of this total level to the driver circuit 14. Since, due to this, a drive signal is outputted to the driver circuit 14 for applying braking to the objective lens 4a in the opposite direction to its current direction of motion of approaching towards the recording surface of the first layer L1, accordingly the speed of displacement of the objective lens 4A gradually drops. Together with this the level of the FE signal gradually becomes greater in the negative direction along with the focusing position of the read light approaching towards the recording surface of the first layer L1, and, after having passed through its maximum negative value, describes a peak and returns back to the zero level again.

And, when the level of the FE signal becomes greater than or equal to the brake end threshold value BE (a step S10), then the control unit 11 issues a command to the drive pulse generation circuit 15 to terminate the brake pulse (a step S1). Due to this, the drive pulse generation circuit 15 stops generating the negative polarity brake pulse shown in FIG. 7C or FIG. 7D, according to this command. As a result, the motion of the objective lens 4A transitions to uniform speed motion at a very low speed. And, as shown in FIG. 5E, the FZC signal drops when the level of the FE signal passes through the zero level.

Finally, taking the dropping of the FZC signal as a trigger, the control unit 11 closes the focus servo control (a step S12). In other words, the control unit 11 turns the focus servo loop ON along with releasing the hold of the hold circuit. Due to this, the FE signal is outputted to the driver circuit 14 via the focus servo circuit 12 and the adder 16. And, subsequent to this, the optical disk device 1 is in the state of performing focus servo control by shifting the focusing position of the read light upon the recording surface of the first layer L1, which is now the target, on the basis of the FE signal. And the optical disk device 1 replays video and audio data recorded upon this first layer L1.

The optical disk device 1 performs layer jump according to the flow as described above. Due to this, even if an inter-layer offset such as shown by the double-dotted broken line in FIG. 7A occurs in the above described intermediate section, the timing at which application of the brake pulse starts is almost the same as the timing at normal times (refer to FIGS. 7B and 7C). In a similar manner, even if an inter-layer offset such as shown by the single-dotted broken line in FIG. 7A occurs in the above described intermediate section, the timing at which application of the kick pulse ends is almost the same as the timing at normal times (refer to FIGS. 7B and 7D). Due to this, it is possible for this optical disk device 1 to prevent excessive application of brake or kick, since there is no great variation in the timing of the start of application of the brake pulse or in the timing of the end of the kick pulse. Accordingly, even if an inter-layer offset has occurred, this optical disk device 1 is able to transition in a normal manner to the state in which focus servo control is being performed upon the second layer L2. And, due to this, this optical disk device 1 is also able to prevent the occurrence of collision between the objective lens 4A and the recording surface of the optical disk 2, which would be undesirable.

Thus, this optical disk device 1 is able to transition smoothly from the state in which the pickup 4 is reading out information recorded upon the first layer L1, the state in which it reads out information recorded upon the second layer L2, even if an inter-layer offset such as described above occurs. And, due to this, this optical disk device 1 is also able to prevent damage to the optical disk device 1 taking place due to the objective lens 4A coming into collision with the recording surface of the optical disk 2, such as the objective lens 4A suffering damage or damage taking place to the optical disk 2.

Moreover, the following variant embodiments of this embodiment of the present invention may be employed.

Variant Embodiment 1

It will also be acceptable to provide a prohibition key to the actuation unit 20, which prohibits change of the value of the kick end threshold value KE or of the value of the brake start threshold value BS. When the user turns this prohibit key ON, the control unit 11 records a flag in the register 11C to the effect that change of the value of the kick end threshold value KE or of the value of the brake start threshold value BS is prohibited. And, during the layer jump operation shown in FIG. 6, the control unit 11 skips the processing of the steps S1 and S2, and starts from the processing of the step S3. Since by doing this the processing of the steps S1 and S2 is omitted, accordingly the time period needed for layer jump may be shortened, if no inter-layer offset such as that shown in FIG. 7 occurs. And, due to this, for example, the time period needed from depression of the time search key during replay from the first layer L1, until replay from the second layer L2 starts, is shortened. Accordingly, the convenience of use from the point of view of the user may be enhanced.

Variant Embodiment 2

Even if an inter-layer offset occurs, it is still possible to execute normal layer jump operation by the jump pulse shown in FIG. 7B, provided that the value of the inter-layer offset satisfies the relationship "zero level<value of inter-layer offset<kick end threshold value KE1", or the relationship "zero level>value of inter-layer offset>brake start threshold value BS1".

Thus, before executing the layer jump operation, the control unit 11 decides whether or not the value of the offset voltage is greater than or equal to a predetermined value. And the control unit 11 executes the steps S1 and S2, only when the value of the offset voltage is greater than or equal to the predetermined value. Conversely, when the value of the offset voltage is less than the predetermined value, the control unit 11 skips the steps S1 and S2. The predetermined value may, in the case of FIG. 7 for example, be set in advance to a value which satisfies the relationship "zero level<predetermined value<kick end threshold value KE1", or the relationship "zero level>predetermined value>brake start threshold value BS1". Since, by doing this, the processing of the steps S1 and S2 may be omitted, accordingly the time period required for layer jump may be shortened. And, due to this, for example, the time period needed from depression of the time search key during replay from the first layer L1, until replay from the second layer L2 starts, is shortened. Accordingly, the convenience of use from the point of view of the user may be enhanced.

Finally, all of the features described in the explanation of this embodiment given above are only cited by way of example, and must not be viewed as being limitative of the present invention in any way. The scope of the present invention is not defined by the embodiment described above, but only by the range of the Claims. Moreover, all changes which are equivalent in meaning and scope to the scope of the Claims, are intended to be included within the range of the present invention.

What is claimed is:

1. An optical disk device, comprising:
  a pickup for irradiating laser light upon an optical disk having a plurality of information recording layers, and for detecting light reflected therefrom;
  an offset means for generating a focus error signal on the basis of the reflected light detected by the pickup, and for applying to the focus error signal an offset voltage specifying an adjusted voltage value;
  a focus servo means for shifting the lens towards and away from an information recording surface of a predetermined layer of the information recording layers, on the basis of an offset focus error signal, thus performing focus servo control to focus the laser light upon the information recording surface, the offset focus error signal being the focus error signal to which the offset voltage has been applied by the offset means; and
  a layer jump means for performing a layer jump operation in which the lens is shifted from a position in which focus servo control is being performed upon a first layer, to a position in which focus servo control is performed upon a second layer,
  wherein the layer jump operation includes the following four operations:
    a kick start operation of, when the level of the offset focus error signal passers through a first threshold value, accelerating the lens towards or away from the information recording surface;
    a kick end operation of, when the level of the offset focus error signal passes through a second threshold value, stopping the acceleration driving of the lens;
    a brake start operation of when the level of the offset focus error signal passes through a third threshold value, accelerating the lens in a direction which is opposite to the direction in which the lens is moving due to the stopping of acceleration driving; and
    a brake end operation of when the level of the offset focus error signal passes through a fourth threshold value, stopping the acceleration driving of the lens,
  wherein before performing the layer jump operation, the layer jump means changes the value of the second threshold value or the value of the third threshold value, according to the value of the offset voltage, and
  wherein the optical disk device further comprises a prohibition means for prohibiting the layer jump means from changing the value of the second threshold value or the value of the third threshold value.

2. The optical disk device according to claim 1, wherein, if the offset voltage causes the focus error signal to be displaced to the positive side, the layer jump means set the third threshold value to be relatively small.

3. The optical disk device according to claim 1, wherein, if the offset voltage causes the focus error signal to be displaced to the negative side, the layer jump means sets the second threshold value to be relatively large.

4. The optical disk device according to claim 1, wherein the layer jump means:
  before executing the layer jump operation, decides whether or not the value of the offset voltage is greater than or equal to the predetermined value, changes the value of the second threshold value or the value of the third threshold value, according to the voltage value of the offset voltage; and
  if the value of the offset voltage is less than the predetermined value, prohibits the changing of the second threshold value or of the third threshold value.

* * * * *